United States Patent [19]

Akutsu et al.

[11] 4,397,629
[45] Aug. 9, 1983

[54] APPARATUS FOR DRAWING MOUTH-NECK PORTIONS OF SYNTHETIC RESIN BOTTLES

[75] Inventors: Masao Akutsu; Akiho Ota; Takuzo Takada, all of Tokyo, Japan

[73] Assignee: Yoshino Kogyosho Co. Ltd., Tokyo, Japan

[21] Appl. No.: 258,257

[22] Filed: Apr. 28, 1981

Related U.S. Application Data

[63] Continuation of Ser. No. 96,767, Nov. 23, 1979, abandoned.

[51] Int. Cl.³ ........................ B29C 17/07; B29C 17/02
[52] U.S. Cl. .................................. 425/525; 264/533; 264/296; 264/322; 425/392; 425/393; 425/DIG. 14
[58] Field of Search ....... 425/525, 392, 393, DIG. 14, 425/DIG. 218; 264/533, 296, 313, 314, 322, 521

[56] References Cited

U.S. PATENT DOCUMENTS

| | | | |
|---|---|---|---|
| 2,127,043 | 8/1938 | Most | 264/322 X |
| 3,032,823 | 5/1962 | Sherman | 264/533 |
| 3,247,548 | 4/1966 | Fields et al. | 264/313 X |
| 3,248,756 | 5/1966 | Mills et al. | 425/392 |
| 3,677,684 | 7/1972 | Platz | 425/DIG. 218 |
| 3,901,640 | 8/1975 | Tigner et al. | 425/DIG. 14 |
| 4,015,923 | 4/1977 | Järvinen et al. | 425/393 |
| 4,097,570 | 6/1978 | Dickson et al. | 264/533 |
| 4,158,692 | 6/1979 | Nilsson | 264/296 X |
| 4,297,306 | 10/1981 | Yoshino et al. | 425/525 X |

Primary Examiner—Jan H. Silbaugh

[57] ABSTRACT

Apparatus for drawing a mouth-neck portion of a synthetic resin bottle in the radial direction, by inserting an expanding operation zone of the apparatus into the mouth-neck portion in the heated state and expanding respective drawing pieces of the expanding operation zone in the radial direction. The apparatus includes a cylindrical wall constructed by a great number of drawing pieces, a pressing rod inserted into this cylindrical wall to expand the drawing pieces in the radial direction and an elastic tubular member to be inflated in the radial direction by high pressure compressed air.

4 Claims, 11 Drawing Figures

FIG. 4
FIG. 5
FIG. 6
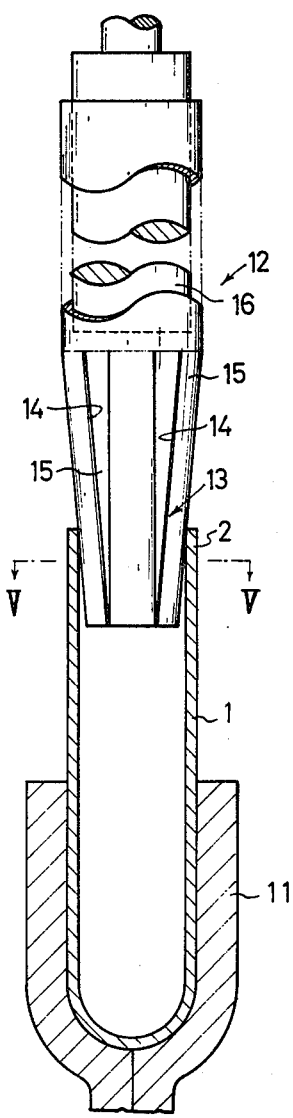
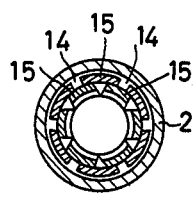
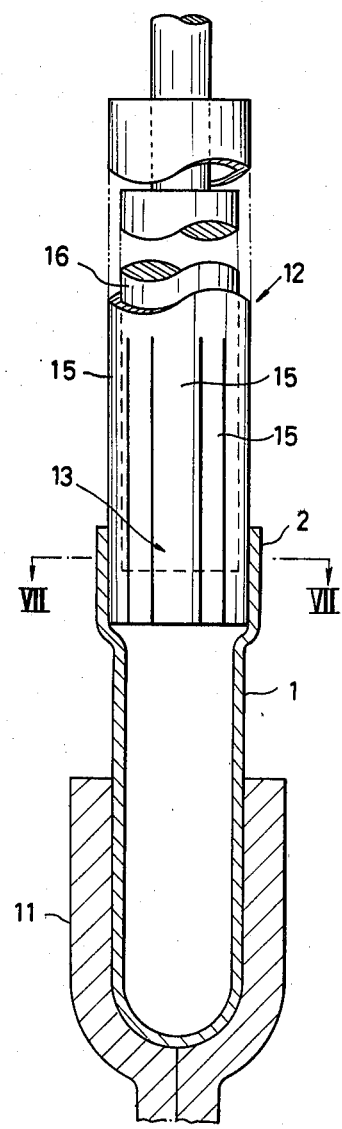
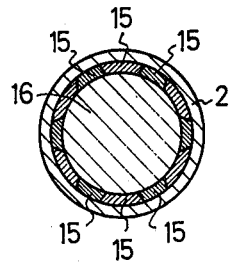
FIG. 7

APPARATUS FOR DRAWING MOUTH-NECK PORTIONS OF SYNTHETIC RESIN BOTTLES

This is a continuation of application Ser. No. 096,767 filed Nov. 23, 1979, now abandoned.

BACKGROUND OF THE INVENTION

1. Field of the Invention

The present invention relates to a method and apparatus for drawing a mouth-neck portion of a bottle composed of a saturated polyester resin or a precursor intermediate product thereof.

2. Description of the Prior Art

Saturated polyester resins are excellent in the physical properties and durability. However, in order to manifest these excellent physical properties and durability in saturated polyester resins, it is indispensable that these saturated polyester resins should be drawn.

Therefore, according to conventional techniques, bottles of saturated polyester resins are prepared by forming a primary intermediate molded article having an effective cylindrical shape by injection molding, blow-molding this primary intermediate molded article into a bottle and drawing the so formed bottle.

According to the conventional techniques, the bottles are subjected to drawing at the blow-molding step, and as is well known, at the blow-molding step, the mouth-neck portion of the bottle is held on a mold for blow molding. Therefore, the mouth-neck portion of the bottle is not substantially subjected to the drawing operation.

Accordingly, the undrawn mouth-neck portion is inferior to the drawn barrel portion of the bottle in the physical properties and durability, and the bottle is not completely satisfactory in the physical properties and durability.

For example, when a high concentration is stored in this conventional bottle, no trouble is caused in the barrel portion but the mouth-neck portion is whitened and becomes mechanically brittle since the alcohol permeates in the mouth-neck portion. Furthermore, a great number of fine cracks are formed in the mouth-neck portion and the sealing effect is drastically reduced.

OBJECTS OF THE INVENTION

It is therefore a primary object of the present invention to provide a method for drawing a mouth-neck portion in which not only the barrel portion but also the mouth-neck portion of a bottle composed of a saturated polyester resin is drawn to form a bottle excellent in the physical properties and durability.

Another object of the present invention is to provide a method for drawing a mouth-neck portion of a bottle in which a expanding force acting in the radial direction is given uniformly to respective parts on the circumference of the neck-mouth portion of a bottle to draw the mouth-neck portion precisely in a predetermined manner.

A third object of the present invention to provide a method for drawing a mouth-neck portion of a bottle in which a spiral screw thread is formed on the periphery of the mouth-neck portion while the mouth-neck portion is drawn.

A fourth object of the present invention is to provide an apparatus for drawing a mouth-neck portion of a bottle, which is used effectively for practicing the above-mentioned drawing method.

BRIEF DESCRIPTION OF THE DRAWINGS

FIGS. 1 to 3 are diagrams illustrating a first embodiment of the present invention, in which FIG. 1 is a sectional view showing the state in which the drawing apparatus is inserted in an intermediate molded article of a bottle, FIG. 2 is a sectional view showing the state of the mouth-neck portion of the bottle after the drawing operation and FIG. 3 is a view showing the section taken along the line III—III in FIG. 2.

FIGS. 4 to 7 are diagrams illustrating a second embodiment of the present invention, in which FIG. 4 is a sectional view showing the state in which the drawing apparatus is inserted in an intermediate molded article of a bottle, FIG. 5 is a view showing the section taken along the line V—V in FIG. 4, FIG. 6 is a sectional view illustrating the state where the mouth-neck portion of the bottle is being drawn by the drawing apparaus and FIG. 7 is a view showing the section taken along the line VII—VII in FIG. 6.

FIGS. 8 to 10 are diagrams illustrating a third embodiment of the present invention, in which FIG. 8 is a sectional view illustrating the state in which the drawing apparatus is inserted into an intermediate molded article of a bottle, FIG. 9 is a view showing the section taken along the line IX—IX in FIG. 8 and FIG. 10 is a sectional view showing the state where the intermediate molded article is being drawn by the drawing apparatus.

DETAILED DESCRIPTION OF THE PREFERRED EMBODIMENTS

Figure 1:
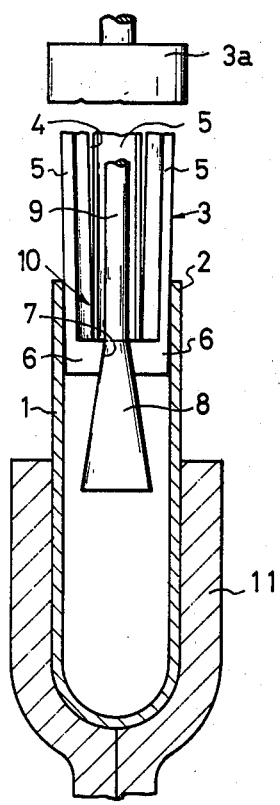
Figure 2:
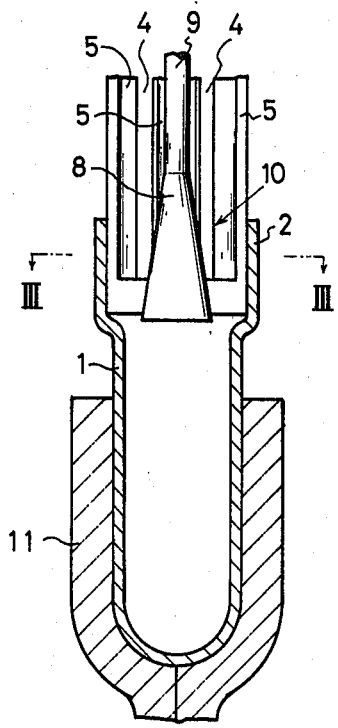
Figure 3:
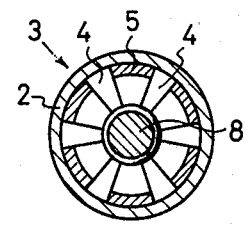

The first embodiment of the present invention will now be described with reference to FIGS. 1 to 3.

An intermediate molded article 1 is a bottomed tubular member formed by injection molding of a saturated polyester resin. A drawable synthetic resin such as a polypropylene resin or vinyl chloride resin may be used instead of the saturated polyester resin.

A mouth-neck portion 2 on the top end of the intermediate molded article 1 is to be formed into a mouth-neck portion of the resulting bottle. In the present invention, also this mouth-neck portion 2 is drawn in the radial direction by a drawing apparatus 3 as well as the barrel portion.

The drawing apparatus 3 will now be described.

The drawing apparatus 3 comprises a cylinder including a base portion 3a and a tapered top end. A great number of cut grooves 4 extending in the axial direction are formed in the tapered top end of the cylinder and a drawing piece 5 is mounted between every two adjacent cut grooves 4. A guide piece 6 is projected from the top end of each drawing piece 5 inwardly in the radial direction of the cylinder, and these guide pieces 6 are assembled to form in the central portion a taper hole 7 having a diameter decreased toward the upper portion. A taper rod 8 having a diameter increased toward the top end is inserted into the taper hole 7 and the upper end of the taper rod 8 is connected to a pressing rod 9 so that the upper end of said rod 9 is projected beyond the base portion 3a and the rod 9 is pushed and shifted in the axial direction. More specifically, an expanding operation zone 10 which can expand in the radial direction is constructed by the respective drawing pieces 5 so that when the pressing rod 9 is pulled up, the taper hole 7 is expanded in the radial direction by the taper rod 8 and the respective drawing pieces 5 are expanded in the radial direction.

When the mouth-neck portion 2 of the intermediate molded article 1 is drawn by the above-mentioned drawing apparatus 3, the lower portion of the intermediate molded article 1 formed in advance by injection molding is held by a holding member 11. The mouth-neck portion 2 is heated at a temperature high enough to effect drawing. This heating may be performed before the mouth-neck portion 2 is held by the holding member 11. Then, the expanding operation zone 10 of the drawing apparatus 3 is inserted in the mouth-neck portion 2 as shown in FIG. 1. At this point, the small-diameter portion of the taper rod 8 is located in the taper hole 7 and the expanding operation zone 10 is in the contracted state.

Then, the pressing rod 9 is pulled up. At this point, the respective drawing pieces 5 are outwardly expanded by the inclined face of the taper rod 8 as shown in FIGS. 2 and 3. Accordingly, the mouth-neck portion 2 of the intermediate molded article 1 is drawn in the radial direction. Since the respective drawing pieces 5 are pushed by the inclined face of the taper rod 8 and they are expanded synchronously in the radial direction, irregular deformation of the mouth-neck portion 2 is prevented and the mouth-neck portion 2 is uniformly drawn in a predetermined manner.

When the pressing rod 9 is then downwardly pushed to return the taper rod 8 to the original position, the respective drawing pieces 5 are returned inwardly in the radial direction by their own elastic force and the drawing pieces 5 separate from the inner circumferential face of the mouth-neck portion 2. Then, the expanding operation zone 10 of the drawing apparatus 3 is withdrawn from the mouth-neck portion 2, and the barrel portion of the intermediate molded article 1 is drawn according to a customary blow-molding method to form a bottle.

As will be apparent from the foregoing illustration, according to the present embodiment, even the mouth-neck portion of the bottle is drawn, and therefore, the mouth-neck portion is not inferior to the barrel portion at all in the physical properties and durability, with a result that an excellent bottle can be provided according to the present embodiment. Moreover, since the drawing apparatus is arranged so that the respective drawing pieces constituting the expanding operation zone are synchronously expanded by the taper rod, the mouth-neck portion can be drawn uniformly and precisely in a predetermined manner. Accordingly, the mouth-neck portion of the bottle can be drawn effectively by the drawing apparatus having the above-mentioned simple structure. In the present embodiment, the mouth-neck portion is drawn prior to drawing of the barrel portion. In the present invention, the mouth-neck portion of the intermediate molded article may be drawn after drawing of the barrel portion.

The second embodiment of the present invention will now be described with reference to FIGS. 4 to 7.

In this embodiment, a drawing apparatus capable of drawing the mouth-neck portion in a shape much closer to the cylindrical form is used. In this drawing apparatus 12, an expanding operation zone 13 is formed to have a tapered configuration in which the diameter is gradually decreased toward the top end. A plurality of cut grooves 14 extending in the axial direction are formed on the expanding operation zone 13 and a drawing piece 15 is formed between every two adjacent cut grooves 14. Every other drawing piece 15 is inwardly bent so that both the ends of every alternate drawing pieces 15 are overlapped. A pressing rod 16 having substantially the same diameter as the inner diameter of the cylindrical expanding operation zone 13 is inserted in the expanding operation zone 13 as means for expanding the respective drawing pieces 15 in the radial direction. The pressing rod 16 is arranged so that when the expanding operation zone 13 is in the contracted state, the top end of the pressing rod 16 is located on bases of the drawing pieces 15. When the pressing rod 16 is pressed, the respective drawing pieces 15 are expanded in the radial direction against their own elastic force, and when the drawing pieces 15 are expanded to such an extent that both the inner drawing pieces 15 and outer drawing pieces 15 are located on the same circumference, the drawing operation of the mouth-neck portion 2 is completed.

When the mouth-neck portion 2 is drawn by using the drawing apparatus 12 of this second embodiment, the intermediate molded article 1 is held by a holding member 11, and the expanding operation zone 13 is inserted in the mouth-neck portion 2 as shown in FIG. 4. At this point, the respective drawing pieces 15 of the drawing apparatus 12 are in the alternately overlapped state as shown in FIG. 5.

When the pressing rod 16 is then pushed into the expanding operation zone 13 by operating the base of the rod 16, the respective drawing pieces 15 are gradually expanded in the radial direction against the elastic force thereof, and when both the inner drawing pieces 15 and outer drawing pieces 15 are located on the same circumference as shown in FIG. 7, drawing of the mouth-neck portion 2 is completed.

When the pressing rod 16 is then withdrawn and returned to the original position, the respective drawing pieces are inwardly returned in the radial direction by the elastic force thereof and separate from the inner peripheral wall of the mouth-neck portion 2. In this embodiment, since the inner drawing pieces have a larger elastic return force than the outer drawing pieces, there is restored the state where every two drawing pieces are overlapped. Then, the expanding operation zone 13 is withdrawn from the mouth-neck portion 2 and the intermediate molded article 1 is subjected to blow molding to form a bottle.

According to the above-mentioned second embodiment, in the initial stage of the drawing step using the drawing apparatus 12, only the outer drawing pieces 15 fall in contact with the inner circumferential wall of the mouth-neck portion 2, but at the point of termination of the drawing operation, all the drawing pieces 15 fall in contact with the inner circumferential wall of the mouth-neck portion 2. Accordingly, the mouth-neck portion 2 is drawn in the shape much closer to a true circle. Even if the mouth-neck portion is shaped in the form other than the cylindrical form, the mouth-neck portion 2 can be drawn precisely along the drawing pieces expanded in a predetermined shape. In this second embodiment, the effect attained in the first embodiment can be similarly attained. The present second embodiment is preferably adopted when it is necessary to mold the mouth-neck portion of the bottle more precisely.

Figure 8:
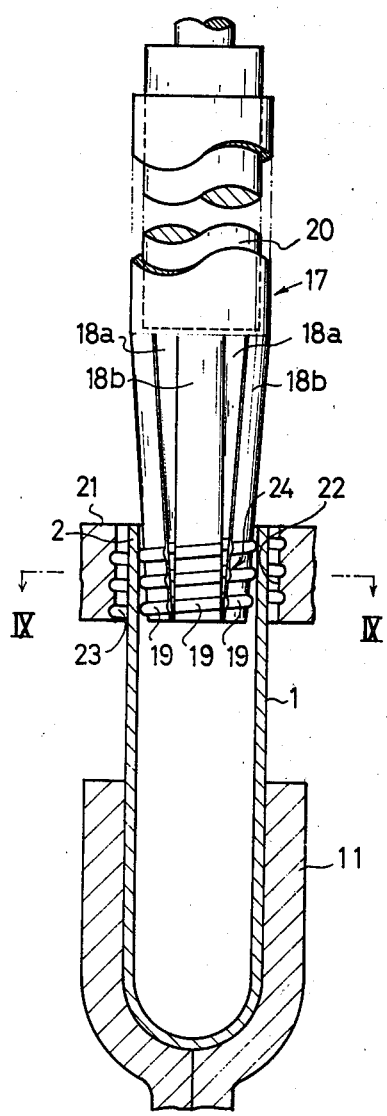
Figure 9:
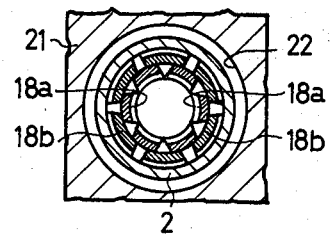
Figure 10:
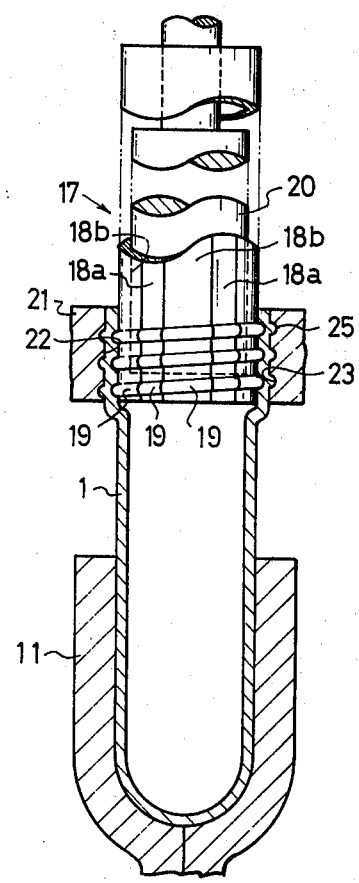

The third embodiment will now be described with reference to FIGS. 8 to 10.

In this embodiment, a screw thread is formed on each drawing piece of the drawing apparatus used in the second embodiment, and the mouth-neck portion 2 is screwed while it is being drawn.

More specifically, a spiral screw thread 19 is projected from the outer face of the top end of each of inner and outer drawing pieces 18a and 18b of the drawing apparatus 17 so that when the drawing pieces 18a and 18b are expanded on the same circle by pushing of a pressing rod 20, whereby all the drawing pieces are connected and one spiral screw is formed. A two-split mold 21 is used for drawing the mouth-neck portion 2, and a spiral screw groove 23 corresponding to the sprial screw 19 is formed in the hole wall 22 defining the mouth-neck portion.

The method for drawing the mouth-neck portion 12 by using the drawing apparatus 17 and mold 21 will now be described. The intermediate molded article 1 is held by the holding member 11 and the mouth-neck portion 2 is heated at a temperature high enough to effect drawing. The mouth-neck portion 2 is placed in the hole wall 22 of the mold 21 as shown in FIG. 8, and the expanding operation zone 24 of the drawing apparatus 17 is inserted in the mouth-neck portion 2. At this point, the insertion state of the enlarging operation zone 24 of the drawing apparatus 17 is controlled so that the spiral screw 19 defined by the drawing pieces 18a and 18b is located at a position corresponding to the screw groove 23 of the mold 21. In this state, the side ends of the inner and outer drawing pieces 18a and 18b are overlapped as shown in FIG. 9.

When the pressing rod 20 is then pushed into the expanding operation zone 24, the respective drawing pieces 18a and 18b are gradually expanded in the radial direction, and if they are expanded beyond a certain degree, the inner drawing pieces 18a are intruded between every two adjacent outer drawing pieces 18b. At the point of termination of drawing, the respective drawing pieces 18a and 18b are located on the same circumference and a continuous spiral screw 19 is formed by the threaded portions of the drawing pieces 18a and 18b. The mouth-neck portion 2 is drawn by the expanding operation zone 23 and falls in contact with the cavity wall 22 of the mold 21. At this point, the peripheral wall portion of the mouth-neck portion 2 is pressed into the spiral screw groove 22 of the mold 21 by projection of the spiral screw 19 formed by the drawing pieces 18a and 18b. Accordingly, a screw thread 25 is formed on the periphery of the mouth-neck portion 2 while it is drawn in the radial direction.

When the pressing rod 20 is then withdrawn, the respective drawing pieces 18a and 18b are returned inwardly in the radial direction by the elastic force thereof, and the expanding operation zone 24 is pulled out from the mouth-neck portion 2. Then, the mold 21 is split and the intermediate molded article 1 is subjected to blow molding to form a bottle.

As will be apparent from the foregoing illustration, a spiral screw thread can be formed on the periphery of the mouth-neck portion simultaneously with drawing of the mouth-neck portion of the bottle. Furthermore, since a screw thread is formed between the expanding operation zone of the drawing device and the mold, the drawing precision can be further improved. Moreover, since the mouth-neck portion is drawn, the mouth-neck portion of the bottle is not inferior to the barrel portion at all with respect to the physical properties and durability.

Figure 11:
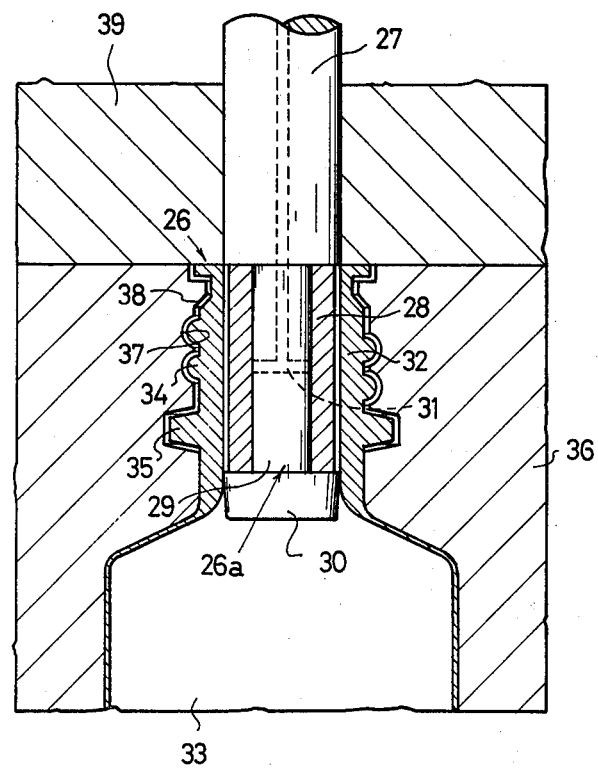
FIG. 11 is a sectional view illustrating the state in which the mouth-neck portion of a bottle is being drawn by the drawing apparatus in a fourth embodiment of the present invention.

The fourth embodiment will now be described with reference to FIG. 11.

In the present embodiment, there is adopted a drawing apparatus in which high pressure compressed air is injected into an elastic tubular member to inflate the tubular member and the mouth-neck portion 2 of a bottle is drawn by this inflation of the tubular member. This drawing apparatus 26 comprises a rod portion 27 and a small-diameter rod portion 29 formed on the top end of the rod portion 27. An elastic tube member 28 is fitted in the small-diameter rod portion 29 and a seal member 30 is attached to the top end of the small-diameter rod portion 29, whereby a hole passage 31 is formed along the rod portion 27 and the small-diameter rod portion 29 to apply high-pressure compressed air to the inner circumferential wall of the elastic tubular member 28.

The method for drawing the mouth-neck portion of a bottle by using the drawing apparatus 26 will now be described.

An intermediate molded article formed by injection molding is subjected to blow molding, except a mouth-neck portion 32, to form a bottle 33. At the step of molding of the intermediate molded article, a screw thread 34 for engagement with a cap is formed on the periphery of the mouth-neck portion 32, and a flange 35 is formed on the outer face of the lower part of the mouth-neck portion 33.

The mouth-neck portion 32 of the bottle 33 is heated at a temperature high enough to effect drawing, for example, about 100° C., and the mouth-neck portion 32 is set in a mold 36 having a spiral screw groove or flange groove formed on the inner circumferential wall face 37. In this state, the diameter of the mouth-neck portion 32 is smaller than the diameter of the mouth-neck portion of the final bottle. Accordingly, a certain clearance 38 corresponding to the drawing size is formed between the inner circumferential wall face 37 and the mouth-neck portion 32. The expanding operation zone 26a of the drawing device 26 is inserted in the mouth-neck portion 32, and a closing mold 39 is placed on the top face of the mold 36 so as to prevent leakage of high pressure compressed air injected in the inner circumferential wall of the elastic tubular member 28.

When high pressure compressed air is then injected into the hole passage 31 from a compressor or the like, the pressure in the inner circumferential wall of the elastic tubular member 28 is elevated and therefore, the inner circumferential wall is expanded in the radial direction, with a result that the mouth-neck portion 32 is drawn in the radial direction. Then, high pressure compressed air is discharged through the hole passage 31, whereby the elastic tubular member 28 is contracted and withdrawal of the drawing apparatus becomes possible.

In the fourth embodiment, the barrel portion is biaxially drawn prior to drawing of the mouth-neck portion. Of course, the mouth-neck portion may be drawn prior to drawing of the barrel portion.

In the fourth embodiment, since an apparatus for inflating an elastic tubular member by high pressure compressed air is used as the drawing apparatus, the inner wall of the mouth-neck portion is not damaged at all by the drawing operation and the drawing operation can be facilitated. Therefore, the mouth-neck portion can be drawn at a much elevated precision.

What is claimed is:

1. Apparatus for forming a complete synthetic resin bottle from a parison having an open mouth neck portion at one end and a closed barrel portion at the other end, comprising:

a holding member for holding a parison composed of synthetic resin material;

means for heating a mouth-neck portion of the parison to a temperature high enough to permit reshaping of the heated synthetic resin material;

a cylindrical longitudinally segmented molding tool, for insertion into said mouth-neck portion, which tapers inwardly from a first top diameter to a second narrower bottom diameter, adjacent segments defining therebetween a plurality of longitudinal v-shaped openings on the face of said molding tool, said molding tool carrying a rod between the segments thereof;

means for pulling the rod through the molding tool between the segments to radially outwardly expand the segments and increase the bottom diameter of the molding tool, whereby the mouth-neck portion of the parison is radially expanded; and means for blow-molding the remaining portion of the parison to form a barrel portion of a complete bottle.

2. Apparatus for forming a complete synthetic resin bottle from a parison having an open mouth-neck portion at one end and a closed barrel portion at the other end, comprising:

a holding member for holding a parison composed of synthetic resin material;

means for heating a mouth-neck portion of the parison to a temperature high enough to permit reshaping of the heated synthetic resin material;

cylindrical longitudinally-segmented molding tool for insertion into said mouth-neck portion, having a top end and a bottom end, said bottom end being smaller in diameter than said top end, said tool evenly tapering from said top end to said bottom end, adjacent segments defining therebetween a plurality of longitudinal V-shaped openings on the surface of said molding tool whereby said molding tool carries a tapered rod between the segments thereof, said molding tool surrounding the minimum diameter of the tapered rod;

means for pulling the tapered rod, minimum diameter end first, through the molding tool, between the segments to radially outwardly expand the segments and increase the diameter of the bottom end of the molding tool, whereby the mouth-neck portion of the parison is radially expanded; and means for blow-molding the remaining portion of the parison to form the barrel portion of a complete bottle.

3. The apparatus as claimed in claim 2, wherein said molding tool includes guide pieces provided at the ends of the segments that are inserted into the mouth-neck portion for bearing against said tapered rod.

4. The apparatus as claimed in claim 2, wherein said molding tool includes at said bottom end guide pieces, said guide pieces being integrally formed with said segments and projecting horizontally toward said tapered rod, said guide pieces bearing against and having a taper corresponding to that of said tapered rod.

* * * * *